E. B. Lake,
Bed-Bug Trap,

N°. 57,338.        Patented Aug. 21, 1866.

Witnesses:
J. W. Bonnington
W<sup>m</sup> Trewin

Inventor
Ezra B Lake
Per Munn & Co
Attorneys

UNITED STATES PATENT OFFICE.

EZRA B. LAKE, OF BRIDGEPORT, NEW JERSEY.

IMPROVEMENT IN BED-BUG TRAPS.

Specification forming part of Letters Patent No. 57,338, dated August 21, 1866.

*To all whom it may concern:*

Be it known that I, EZRA B. LAKE, of Bridgeport, Gloucester county, and State of New Jersey, have invented a new and Improved Bed-Bug Trap; and I do hereby declare that the following is a full, clear, and exact description thereof, which will enable others skilled in the art to make and use the same, reference being had to the accompanying drawings, forming part of this specification, in which—

Figure 1:
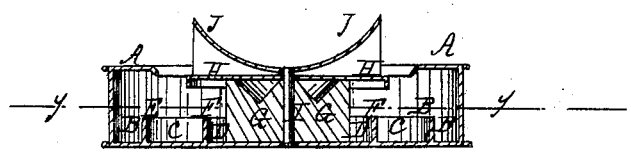
Figure 2:
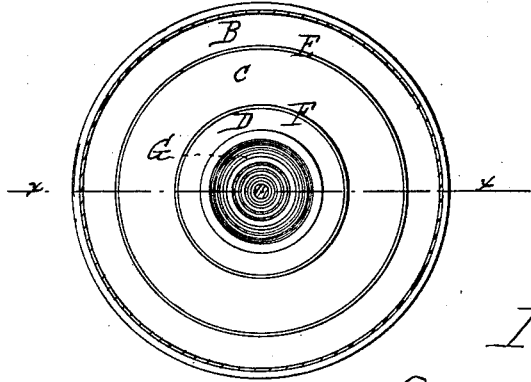

Figure 1 is a vertical section of my improved bed-bug trap, taken through the line $x\ x$, Fig. 2. Fig. 2 is a horizontal section of the same, taken through the line $y\ y$, Fig. 1.

Similar letters of reference indicate like parts.

My invention has for its object to furnish a trap in which bed-bugs may be caught and from which they will be unable to escape; and it consists of a trap constructed and arranged as hereinafter more fully described.

The trap is made in the form of a circular box, as shown in the drawings.

A is a circular rim or flange attached to the upper edge of the sides of the box, as shown in Fig. 1. The inner edge of the rim or flange A is made smooth, and is bent down, so that the bugs, when they go upon the edge of said flange to get at the attractive powder placed beneath it, may slip in, and which prevents them when in from being able to get out.

The interior of the trap is divided into three circular compartments, B, C, and D, by two low partitions, E and F. In the outer compartment, B, and inner one, D, are placed attractive powder, in endeavoring to reach which the bugs will fall into the trap. In the intermediate compartment, C, is placed a poison-powder, which will kill them when they fall or get into it. Within the central compartment, D, is placed a circular block of bass-wood, G, the upper end or face of which is grooved or chambered, as shown in the drawings, and in this groove is also placed some of the attractive powder.

The block G is covered with a circular disk or cap, H, the outer edge of which is made smooth, and is bent down, so that the bugs that may get upon it in endeavoring to get at the attractive powder placed beneath it may slip into the trap and be unable to get out. The block G and disk or cap H are held together and to the bottom of the trap by the screw I, as shown in Fig. 1.

The rim A, disk H, and partitions E and F are so arranged that the downwardly-projecting edges of the said rim and disk may be over the compartment C, which contains the poison-powder, so that the bugs, when they fall into the trap, may fall directly into the said poison and be destroyed.

J is a trough placed upon the top of the disk H, as shown in Fig. 1.

The trap is placed beneath the feet of the bedstead, the block G being designed to sustain its weight. When the bedstead is without rollers or casters, its feet stand directly upon the disk H; but when the bedstead is furnished with rollers or casters the trough J is used, and the casters are placed within the said trough.

I claim as new and desire to secure by Letters Patent—

An improved bed-bug trap, the same consisting of the box with circular flange A, partitions E F, forming compartments B C D, grooved block G, cap H, and trough J, constructed and arranged substantially as herein described, and for the purpose set forth.

EZRA B. LAKE.

Witnesses:
FREELAND HURFF,
JOHN F. TRUILL.